(12) United States Patent
Zhang et al.

(10) Patent No.: US 9,042,879 B2
(45) Date of Patent: May 26, 2015

(54) CAPACITY STATION ACTIVATION METHOD, RADIO COMMUNICATION APPARATUS, AND SYSTEM

(71) Applicant: Huawei Technologies Co., Ltd., Shenzhen, Guangdong (CN)

(72) Inventors: Shunqing Zhang, Shanghai (CN); Xiuqiang Xu, Shanghai (CN); Yan Chen, Shanghai (CN)

(73) Assignee: Huawei Technologies Co., LTD., Shenzhen (CN)

( * ) Notice: Subject to any disclaimer, the term of this patent is extended or adjusted under 35 U.S.C. 154(b) by 23 days.

(21) Appl. No.: 14/066,404

(22) Filed: Oct. 29, 2013

(65) Prior Publication Data
US 2014/0057623 A1 Feb. 27, 2014

Related U.S. Application Data

(63) Continuation of application No. PCT/CN2012/072995, filed on Mar. 26, 2012.

(30) Foreign Application Priority Data

Apr. 29, 2011 (CN) .......................... 2011 1 0111754

(51) Int. Cl.
*H04M 3/00* (2006.01)
*H04W 40/00* (2009.01)
(Continued)

(52) U.S. Cl.
CPC ...... *H04W 28/0289* (2013.01); *H04W 52/0219* (2013.01); *Y02B 60/50* (2013.01);
(Continued)

(58) Field of Classification Search
None
See application file for complete search history.

(56) References Cited

U.S. PATENT DOCUMENTS

2004/0132416 A1 7/2004 Yee
2005/0213673 A1 9/2005 Paquelet et al.
(Continued)

FOREIGN PATENT DOCUMENTS

CN 1630211 A 6/2005
CN 1742457 A 3/2006
(Continued)

OTHER PUBLICATIONS

"3GPP TR 36.927—3$^{rd}$ Generation Partnership Project; Technical Specification Group Radio Access Networks; Evolved Universal Terrestrial Radio Access (E-UTRA); Potential solutions for energy saving for E-UTRAN (Release 10)," Version 1.0.0, 3$^{rd}$ Generation Partnership Project, Valbonne, France (Nov. 2010).
(Continued)

*Primary Examiner* — Erika A Washington
(74) *Attorney, Agent, or Firm* — Leydig, Voit & Mayer, Ltd.

(57) ABSTRACT

Embodiments of the present invention provide a capacity station activation method and system. The method includes: A coverage station sends activation control information to a capacity station, where the activation control information is used to enable the capacity station to send a pilot signal to a user in a power increasing manner; receives a measurement result of measuring the pilot signal by the user; determines, according to the measurement result, a capacity station that needs to be activated to meet a system requirement; and sends activation information to a determined capacity station that needs to be activated to activate the capacity station. With the capacity station activation method and system in the embodiments of the present invention, a capacity station that needs to be activated can be determined more accurately, and furthermore, transmit power of an activated capacity station can be controlled, thereby reducing energy consumption of a whole system.

19 Claims, 2 Drawing Sheets

(51) Int. Cl.
*H04W 28/02* (2009.01)
*H04W 52/02* (2009.01)
*H04W 52/04* (2009.01)
*H04W 16/08* (2009.01)
*H04W 16/32* (2009.01)
*H04W 24/02* (2009.01)
*H04W 28/08* (2009.01)

(52) U.S. Cl.
CPC ............. *H04W 52/04* (2013.01); *H04W 16/08* (2013.01); *H04W 16/32* (2013.01); *H04W 24/02* (2013.01); *H04W 28/0284* (2013.01); *H04W 28/08* (2013.01); *H04W 52/0206* (2013.01)

(56) References Cited

U.S. PATENT DOCUMENTS

| | | | |
|---|---|---|---|
| 2009/0252073 | A1 | 10/2009 | Kim et al. |
| 2009/0253461 | A1* | 10/2009 | Kuwahara ..................... 455/561 |
| 2009/0280819 | A1* | 11/2009 | Brisebois et al. ............. 455/446 |
| 2010/0246686 | A1 | 9/2010 | Pezeshk et al. |
| 2010/0248735 | A1 | 9/2010 | Hamabe et al. |
| 2013/0157651 | A1* | 6/2013 | Khaitan et al. ............. 455/422.1 |

FOREIGN PATENT DOCUMENTS

| | | |
|---|---|---|
| CN | 101822091 A | 9/2010 |
| CN | 102263558 A | 11/2011 |
| WO | WO 2009142425 A2 | 11/2009 |
| WO | WO 2010002991 A1 | 1/2010 |

OTHER PUBLICATIONS

"Mechanism for optimized cell wake up in hotspot deployments," 3GPP TSG RAN WG3 Meeting #69-bis, Xi'an, China, Document R3-102856, 3$^{rd}$ Generation Partnership Project, Valbonne, France (Oct. 11-15, 2010).

"Cell wake up based on low-load period information," 3GPP TSG RAN WG3 Meeting #70, Jacksonville, Florida, Document R3-103279, 3$^{rd}$ Generation Partnership Project, Valbonne, France (Nov. 15-19, 2010).

"BS probing approach for energy saving wake up in hotspot deployments," 3GPP TSG RAN WG3 Meeting #70, Jacksonville, Florida, Document R3-103693, 3$^{rd}$ Generation Partnership Project, Valbonne, France (Nov. 15-19, 2010).

"BS probing evaluation and comparison," 3GPP TSG RAN WG3 Meeting #71, Taipei, Taiwan, Document R3-110737, 3$^{rd}$ Generation Partnership Project, Valbonne, France (Feb. 21-25, 2011).

"BS probing solution for hotspot cell switch-on—Feasibility and benefits," 3GPP TSG RAN WG3 Meeting #70bis, Dublin, Ireland, R1-110028, 3$^{rd}$ Generation Partnership Project, Valbonne, France (Jan. 17-21, 2011).

"Energy Saving solution enhancement," 3GPP TSG RAN WG3 Meeting #72, Barcelona, Spain, R3-111148, 3$^{rd}$ Generation Partnership Project, Valbonne, France (May 9-13, 2011).

"Power control for cell activation in BS probing scheme," 3GPP TSG-RAN WG3 #73bis, Zhuhai, China, R3-112556, 3$^{rd}$ Generation Partnership Project, Valbonne, France (Oct. 10-14, 2011).

"3$^{rd}$ Generation Partnership Project; Technical Specification Group Radio Access Networks; Evolved Universal Terrestrial Radio Access (E-UTRA); Potential solutions for energy saving for E-UTRAN (Release 10)," 3GPP TR 36.927, 1.1.1, pp. 1-21, 3$^{rd}$ Generation Partnership Project, Valbonne, France (Feb. 2011).

International Search Report in corresponding PCT Patent Application No. PCT/CN2011/074508 (Mar. 1, 2012).

Vaishampayan, "Design of Multiple Description Scalar Quantizers," IEEE Transactions on Information Theory, vol. 39, No. 3, pp. 821-834, IEEE, New York, New York (May 1993).

Vaishampayan et al., "Design of Entropy-Constrained Multiple-Description Scalar Quantizers," IEEE Transactions on Information Theory, vol. 40, No. 1, pp. 245-250, IEEE, New York, New York (Jan. 1994).

Vaishampayan et al., "Multiple-Description Vector Quantization with Lattice Codebooks: Design and Analysis," IEEE Transactions on Information Theory, vol. 47, No. 5, pp. 1718-1734, IEEE, New York, New York (Jul. 2001).

Tian et al., "Universal Multiple Description Scalar Quantization: Analysis and Design," IEEE Transactions on Information Theory, vol. 50, No. 9, pp. 2089-2102, IEEE, New York, New York (Sep. 2004).

Ostergaard et al., "n-Channel Entropy-Constrained Multiple-Description Lattice Vector Quantization," IEEE Transactions on Information Theory, vol. 52, No. 5, pp. 1956-1973, IEEE, New York, New York (May 2006).

Ostergaard et al., "n-Channel Asymmetric Entropy-Constrained Multiple-Description Lattice Vector Quantization," IEEE Transactions on Information Theory, vol. 56, No. 12, pp. 6354-6375, IEEE, New York, New York (Dec. 2010).

Frank-Dayan et al., "Dithered Lattice-Based Quantizers for Multiple Descriptions," IEEE Transactions on Information Theory, vol. 48, No. 1, pp. 192-204, IEEE, New York, New York (Jan. 2002).

Huang et al., "Optimal Index Assignment for Multiple Description Lattice Vector Quantization," Proceedings of the Data Compression Conference (DCC'06), IEEE Computer Society (2006).

Li et al., "Quantization with Constrained Relative Entropy and Its Application to Audio Coding," Convention Paper Presented at the 127$^{th}$ Convention, Audio Engineering Society, New York, New York (Oct. 9-12, 2009).

Li et al., "Distribution Preserving Quantization With Dithering and Transformation," IEEE Signal Processing Letters, vol. 17, No. 12, pp. 1014-1017, IEEE, New York, New York (Dec. 2010).

Klejsa et al., "Design Algorithm of Multiple Description Distribution Preserving Quantization (Embodiments)," IEEE Transactions on Signal Processing, IEEE, New York, New York (Jan. 2013).

* cited by examiner

CAPACITY STATION ACTIVATION METHOD, RADIO COMMUNICATION APPARATUS, AND SYSTEM

CROSS-REFERENCE TO RELATED APPLICATIONS

This application is a continuation of International Patent Application No. PCT/CN2012/072995, filed on Mar. 26, 2012, which claims the priority of Chinese Application No. 201110111754.0, filed on Apr. 29, 2011, both of which are hereby incorporated by references in their entities.

FIELD OF THE INVENTION

Embodiments of the present invention relate to communications technologies, and in particular, to a base station activation and power control method, an apparatus, and a radio communication system.

BACKGROUND OF THE INVENTION

As capacity and a data rate increase rapidly, radio communication plays a more and more significant role in energy consumption. To solve a problem of a high capacity and high data requirement, an operator deploys radio networks (GERAN/UTRAN/EUTRAN) of multiple access technologies and deploys base stations (Macro/Micro/LPN) of multiple transmit power levels in the same area, which makes an actual network structure rather complicated. High capacity and a high data rate require a base station to have high transmit power, and numerous low power nodes such as pico stations exacerbate an energy consumption problem undoubtedly.

When the operator deploys a radio network in a certain area, on the basis of providing basic network coverage, the operator generally deploys inter-frequency networks of different standards or inter-frequency networks of the same standard, or deploys a capacity station in a pico area, to upgrade a service or boost capacity. To facilitate the description, here a base station that provides basic network coverage is called a coverage station, and a base station or pico station that upgrades a service or boosts capacity and overlaps with the coverage station in coverage is called a capacity station. When the capacity station is light-loaded, the capacity station enters a dormant state to save power; and when the coverage station is heavy-loaded, a part or all of capacity stations in a dormant state are activated to share a load. In fact, The prior art has the following disadvantages: when the coverage station is heavy-loaded, generally, loads are not evenly distributed in a coverage range, but are centralized in some areas. In this case, only a capacity station in a corresponding area needs to be activated and the capacity station is enabled to work at a proper transmit power level to transfer enough loads out, so that loads are reduced to a proper level. In application, an existing capacity station activation solution may have the following problems: After multiple capacity stations are activated simultaneously and work at a maximum transmit power level, a load of the coverage station may be reduced to an extremely low level or the coverage station is even in a zero-load state, which is not useful for enhancing overall energy efficiency of a network actually.

SUMMARY OF THE INVENTION

An embodiment of the present invention provides a capacity station activation method, so that a capacity station that needs to be activated can be determined more accurately, and furthermore, transmit power of an activated capacity station can be controlled, thereby reducing energy consumption of a whole system.

A capacity station activation method includes:
sending first activation control information to a capacity station, where the first activation control information is used to enable the capacity station to send a pilot signal at first transmit power to a user who is in a linked state with a coverage station, and the capacity station belongs to the coverage station;

receiving a first measurement result of measuring the pilot signal by the user, and determining, according to the first measurement result, a capacity station that needs to be activated to meet a system requirement;

sending activation information to the capacity station that needs to be activated, so that the capacity station that needs to be activated works at the first transmit power after being activated; and if a capacity station that needs to be activated to meet a system requirement cannot be selected according to the first measurement result, sending second activation control information to the capacity station, where the second control information is used to enable the capacity station to send a pilot signal at second transmit power to the user who is in a linked state with the coverage station; receiving a second measurement result of measuring the pilot signal by the user, and determining, according to the second measurement result, a capacity station that needs to be activated; and sending activation information to the capacity station that needs to be activated, so that the capacity station that needs to be activated works at the second transmit power after being activated;

where, the first transmit power is smaller than the second transmit power.

Meanwhile, a radio communication system is further provided and includes a capacity station and a coverage station, where the capacity station belongs to the coverage station, and the coverage station includes at least two levels of transmit power;

the coverage station is configured to: send multiple pieces of activation control information to the capacity station, where the multiple pieces of activation control information enables the capacity station to send a pilot signal to a user in a power increasing manner; receive a measurement result of measuring the pilot signal by the user; determine, according to the measurement result, a capacity station that needs to be activated to meet a system requirement; and send activation information to a determined capacity station that needs to be activated; and the capacity station is configured to: receive the activation control information from the coverage station; send the pilot signal to the user in a power increasing manner until the coverage station determines a capacity station that needs to be activated to meet a system requirement; and is further configured to, in a dormant state, receive the activation information sent by the coverage station, change to a working state, and work at power of sending the pilot signal by the capacity station when the coverage station sends the activation information to a determined capacity station that needs to be activated.

Further, an embodiment of the present invention further provides a radio communication base station, including:

a sending unit, configured to send multiple pieces of activation control information to a capacity station that belongs to the base station, where the multiple pieces of activation control information are used to enable the capacity station to send a pilot signal to a user in a power increasing manner;

a receiving unit, configured to receive a measurement result of measuring the pilot signal by the user; and a calculating unit, configured to: determine, according to the measurement result of measuring the pilot signal by the user, a capacity station that needs to be activated to meet a system requirement, where the sending unit sends activation information to the capacity station that needs to be activated, so that the capacity station that needs to be activated and is in a dormant state changes to a working state and works at power of sending the pilot signal by the capacity station when the coverage station sends the activation information to a determined capacity station that needs to be activated.

In the embodiments of the present invention, a capacity station sends a pilot signal in a power increasing manner to activate the capacity station, and proper transmit power is determined according to a result of measuring the pilot signal by a user, and therefore, after being activated, the capacity station may work at a certain proper transmit power level that is lower than a maximum power level, and it is ensured that a load of a coverage station is reduced to a proper level. Meanwhile, for these capacity stations activated but not working at full transmit power, transmit power of these capacity stations may be increased to a maximum level preferentially to further absorb the load when the load of the coverage station further rises.

DETAILED DESCRIPTION OF THE EMBODIMENTS

Figure 1:
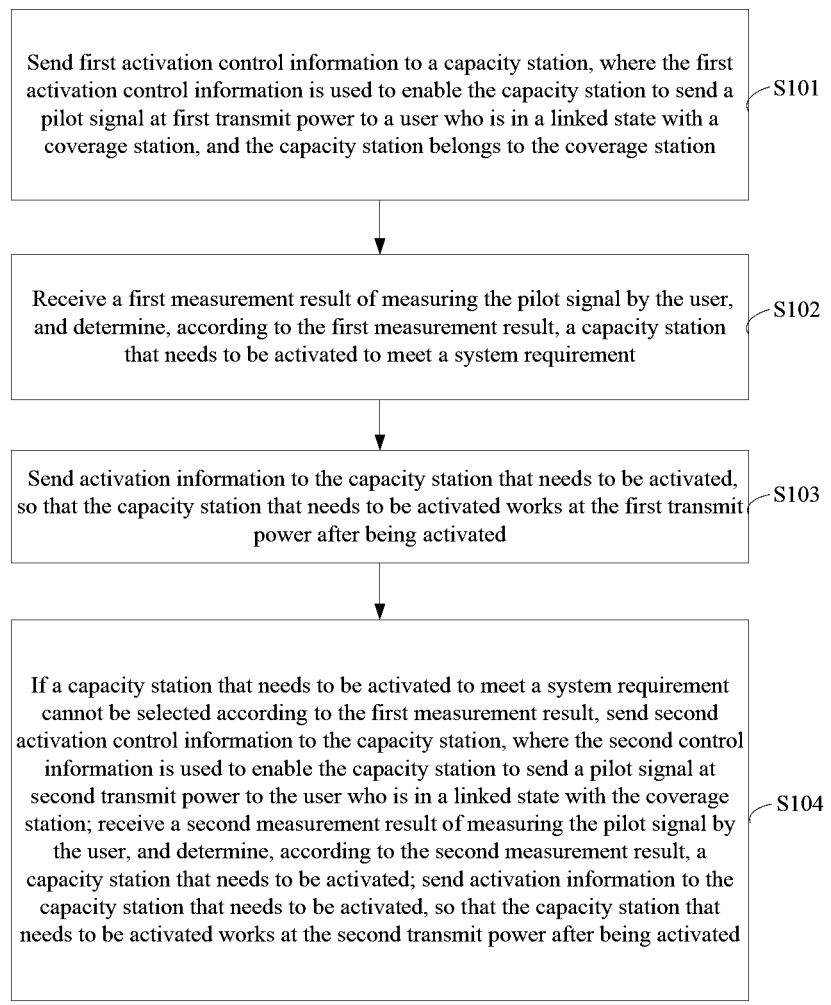
FIG. 1 is a flowchart of a capacity station activation method according to an embodiment of the present invention.

In all embodiments, a capacity station uses at least two pilot transmit power levels, which are $P_{low}$ and $P_{max}$ respectively, in an activation decision process. $P_{max}$ may be maximum pilot transmit power of a pico station, and $P_{low}$ is a certain preset power level that is lower than $P_{max}$. It should be noted that when this solution is practically applied, the pico station may use more pilot transmit power levels. Preferably, highest transmit power is the maximum pilot transmit power of the pico station. In the embodiments, the capacity station adjusts pilot transmit power in an increasing manner sequentially until a coverage station determines a proper capacity station that needs to be activated.

In the following specific implementation manners, a pico station is a capacity station, and a macro base station is a coverage station. The coverage station and the capacity station may be based on the same standard, and may also be based on different standards.

In the embodiments, a load is represented by a typical factor: the number of users in a linked state. That is, the number of users in a linked state is used to represent a change situation of a load of the macro base station and a load that may be absorbed by the pico station after being activated. It should be noted that the technical solutions described in the present invention are also applicable to scenarios in which another factor such as an air interface resource occupancy rate is used to represent a load of a base station, or any combination of factors such as the number of users in a linked state and the air interface resource occupancy rate is used to represent the load.

When a load of the coverage station (such as a macro base station) is greater than a first threshold value, for example, the number of users in a linked state exceeds a preset first threshold $C_{threshold}$, a capacity station set including all capacity stations in a dormant state in a coverage range of the coverage station is $S_{total}$, where N (N≥1) capacity stations (such as pico stations) in a dormant state participate in an activation decision. The N capacity stations in a dormant state are $H_1$, $H_2$, ..., $H_N$ respectively, and these pico stations that participate in an activation decision are represented by a capacity station set S. It should be noted that S may be equal to $S_{total}$, and may also be a subset of $S_{total}$. That is, the macro base station may enable all pico stations in a dormant state in its coverage range to participate in the activation decision, and may also select a part of the pico stations in a dormant state in its coverage range for participating in the activation decision. For example, before the macro base station performs a process of a pico station activation decision, reference is made to long-term load statistics information of each pico station in a dormant state. If the long-term load statistics information shows that in a subsequent time period, a certain pico station maintains a quite low load level for a long time after being activated, or can maintain a medium or high load level only for a quite short time, the macro base station excludes this pico station from the capacity station set S. In the coverage range of the macro base station, a pico station that is in a dormant state but does not belong to the capacity station set S maintains the dormant state, and does not participate in the activation decision. A load herein includes at least the following factor: the number of users in a linked state.

FIG. 1 is a flowchart of a capacity station activation method according to an embodiment of the present invention. This method is executed by a coverage station or an OAM (operation, administration and maintenance module). A coverage station or an OAM is taken as an example for description in the following.

S101: Send first activation control information to a capacity station, where the first activation control information is used to enable the capacity station to send a pilot signal at first transmit power to a user who is in a linked state with a coverage station, and the capacity station belongs to the coverage station.

S102: Receive a first measurement result of measuring the pilot signal by the user, and determine, according to the first measurement result, a capacity station that needs to be activated to meet a system requirement.

S103: Send activation information to the capacity station that needs to be activated, so that the capacity station that needs to be activated works at the first transmit power after being activated.

S104: If a capacity station that needs to be activated to meet a system requirement cannot be selected according to the first measurement result, send second activation control information to the capacity station, where the second control information is used to enable the capacity station to send a pilot signal at second transmit power to the user who is in a linked state with the coverage station; receive a second measurement result of measuring the pilot signal by the user, and determine, according to the second measurement result, a capacity station that needs to be activated; send activation information to the capacity station that needs to be activated, so that the capacity station that needs to be activated works at the second transmit power after being activated.

The first transmit power is smaller than the second transmit power.

Further, if a capacity station that needs to be activated to meet a system requirement cannot be selected according to the second measurement result, send activation information to all capacity stations that participate in an activation decision and belong to the coverage station, and enable an activated capacity station to work at maximum transmit power.

Further, a capacity station that needs to be activated may be determined comprehensively according to the first measurement result and the second measurement result. For example, calculate a difference between the first measurement result and the second measurement result, and determine the capacity station that needs to be activated according to the difference, so that the user is located at a center of a cell after the capacity station that needs to be activated is activated.

Further, if the capacity station has more transmit power levels, in the case that the coverage station selects no proper capacity station that needs to be activated, adjust transmit power of the pilot signal from one power level to another, and select, sequentially according to the measurement result of measuring the pilot signal by the user, a capacity station that needs to be activated, until a proper capacity station that needs to be activated is determined. It may be considered that the foregoing step is repeated in the case of different transmit power. If a capacity station that needs to be activated to meet a system requirement cannot be selected after all transmit power levels are attempted, send activation information to all capacity stations that participate in the activation decision and belong to the coverage station, and enable an activated capacity station to work at maximum transmit power.

In this embodiment of the present invention, a capacity station sends a pilot signal in a power increasing manner to activate the capacity station, and proper transmit power is determined according to a result of measuring the pilot signal by a user, and therefore, after being activated, the capacity station may work at a certain proper transmit power level that is lower than a maximum power level, and it is ensured that a load of a coverage station is reduced to a proper level. Meanwhile, for these capacity stations activated but not working at full transmit power, transmit power of these capacity stations may be increased to a maximum level preferentially to further absorb the load when the load of the coverage station further rises.

In a first embodiment of the present invention, a cell activation solution in which both a macro base station and a pico station are EUTRAN base stations.

Step 1: When the number of users who are in a linked state with a macro base station exceeds a preset threshold $C_{threshold}$ (a first threshold), the macro base station instructs a pico station in a capacity station set S to send a pilot signal in a time of T at a pilot power level of $P_{low}$, and may also send a synchronization signal (the pico station stops sending and returns to a dormant state after sending the pilot signal in the time of T), and configures a user who is in a linked state with the macro base station to perform measurement and reporting on the pilot signal sent by the pico station in S.

Step 2: The macro base station performs the following operations according to a measurement result reported by the user: For each pico station Hi (i=1, 2, . . . , N), count the number of macro base station users that meet a handover condition and report a handover event when this pico station is used as a target base station, where the number of the macro base station users is marked as $C_{i,1}$; and sort pico stations in descending order of $C_{i,1}$. For sorted pico stations, if the first M (1≤M≤N) pico stations exist, which makes the total number of users who are in a current linked state with the macro base station minus a sum of $C_{i\_m,1}$ (m=1, 2, . . . , M) corresponding to the M pico stations be smaller than a preset second threshold $C_{threshold\_1}$ (namely, the total number of users who are in a current linked state with the macro base station minus a sum of $C_{i\_m,1}$ corresponding to the first M−1 pico stations is greater than the preset threshold $C_{threshold\_1}$), the M pico stations are used as candidate pico stations for activation, and are represented by a capacity station set $S_{wake\_up\_1}$ ($S_{wake\_up\_1}$ is a subset of the capacity station set S), and then the procedure proceeds to step 3; and if M cannot be selected, namely, the total number of users who are in a current linked state with the macro base station minus a sum of $C_{i,1}$ corresponding to all pico stations in the capacity station set S is still greater than the preset threshold $C_{threshold\_1}$, the procedure proceeds to step 7.

Step 3: If $C_{i\_M,1}$ corresponding to an $M^{th}$ pico station in selected M pico stations is greater than a third preset threshold $C_{threshold\_2}$, the macro base station activates a pico station in the capacity station set $S_{wake\_up\_1}$ and enables it to work at a pilot transmit power level of $P_{low}$, and other pico stations in the capacity station set S maintain a dormant state, and then the procedure proceeds to step 11; and if $C_{i\_M,1}$ corresponding to the $M^{th}$ pico station in the selected M pico stations is smaller than the preset threshold $C_{threshold\_2}$, the procedure proceeds to step 4.

Step 4: The macro base station instructs the pico station in the capacity station set $S_{wake\_up\_1}$ to send a pilot signal and a synchronization signal at a pilot power level of $P_{max}$ in a time of T (the pico station stops sending after sending the signals in the time of T and returns to the dormant state), and configures the user who is in a linked state with the macro base station to perform measurement and reporting on the pilot signal sent by the pico station in $S_{wake\_up\_1}$. The procedure proceeds to step 5.

Step 5: The macro base station performs the following operations according to a measurement result reported by the user: For each pico station Hi (i=1, 2, . . . , M) in the capacity station set $S_{wake\_up\_1}$, count the number of macro base station users that meet a handover condition and report a handover event when this pico station is used as a target base station, where the number of the macro base station users is marked as $C_{i,2}$; and sort pico stations in descending order of $C_{i,2}$. For sorted pico stations, if the first W (1≤W≤M) pico stations exist, which makes the total number of users who are in a current linked state with the macro base station minus a sum of $C_{i\_m',2}$ (m'=1, 2, . . . , W) corresponding to the W pico stations be smaller than a preset second threshold $C_{threshold\_1}$ (namely, the total number of users who are in a current linked state with the macro base station minus a sum of $C_{1\_m',2}$ corresponding to the first W−1 pico stations is greater than the preset second threshold $C_{threshold\_1}$), the W pico stations are used as candidate pico stations for activation, and are represented by a capacity station set $S_{wake\_up\_2}$ ($S_{wake\_up\_2}$ is a subset of the capacity station set S), and then the procedure proceeds to step 6; and if the number of candidate pico stations is smaller than W (namely, W proper pico stations cannot be selected out), that is, the total number of users who are in a current linked state with the macro base station minus a sum of $C_{i,2}$ corresponding to all pico stations in the capacity station set $S_{wake\_up\_1}$ is still greater than the preset threshold $C_{threshold\_1}$, the procedure proceeds to step 7.

Step 6: The macro base station activates a pico station in the capacity station set $S_{wake\_up\_2}$ and enables it to work at a pilot transmit power level of $P_{max}$, other pico stations in the capacity station set S maintain a dormant state, and then the procedure proceeds to step 11.

Step 7: The macro base station instructs the pico station in the capacity station set S to send a pilot signal and a synchronization signal at a pilot power level of $P_{max}$ in a time of T (the pico station stops sending after sending the signals in the time of T and returns to the dormant state), and configures the user who is in a linked state with the macro base station to perform measurement and reporting on the pilot signal sent by the pico station in S. The procedure proceeds to step 8.

Step 8: The macro base station performs the following operations according to a measurement result reported by the user: For each pico station Hi (i=1, 2, . . . , N), count the number of macro base station users that meet a handover condition and report a handover event when this pico station is used as a target base station, where the number of the macro base station users is marked as $C_{i,3}$; and sort pico stations in descending order of $C_{i,3}$. For sorted pico stations, if the first Q (1≤Q≤N) pico stations exist, which makes the total number of users who are in a current linked state with the macro base station minus a sum of $C_{i\_m'',3}$ (m''=1, 2, . . . , Q) corresponding to the Q pico stations be smaller than a preset second threshold $C_{threshold\_1}$ (namely, the total number of users who are in a current linked state with the macro base station minus a sum of $C_{1\_m'',3}$ corresponding to the first Q−1 pico stations is greater than the preset threshold $C_{threshold\_1}$), the Q pico stations are used as candidate pico stations for activation, and are represented by a capacity station set $S_{wake\_up\_3}$ ($S_{wake\_up\_3}$ is a subset of the capacity station set S), and then the procedure proceeds to step 9; and if the number of candidate pico stations is smaller than Q, namely, the total number of users who are in a current linked state with the macro base station minus a sum of $C_{i,3}$ corresponding to all pico stations in the capacity station set S is still greater than the preset threshold $C_{threshold\_1}$, the procedure proceeds to step 10.

Step 9: The macro base station activates a pico station in the capacity station set $S_{wake\_up\_3}$ and enables it to work at a pilot transmit power level of $P_{max}$, other pico stations in the capacity station set S maintain a dormant state, and the procedure proceeds to step 11.

Step 10: The macro base station activates all pico stations in the capacity station set S and enables them to work at the pilot transmit power level of $P_{max}$, and the procedure proceeds to step 11.

Step 11: When the number of users who are in a linked state with the macro base station further rises and exceeds the first preset threshold $C_{threshold}$, if pico stations activated but not working at full transmit power exist in a coverage range of the macro base station, the macro base station instructs these pico stations activated but not working at full transmit power to increase pilot power to a maximum transmit power level. If the number of users who are in a linked state with the macro base station is still greater than the first threshold $C_{threshold}$ after all activated pico stations in a coverage range of the macro base station work at the maximum pilot transmit power, the macro base station repeats steps 1 to 10 to perform a pico station activation process until all pico stations in the coverage range of the macro base station are in a linked state and work at the maximum pilot transmit power.

Further, if the pico stations use more than two pilot transmit power levels in an activation decision process, steps 1 to 6 are repeated.

Further, if the preset threshold $C_{threshold\_2}$ is very small or even equal to 0, the macro base station, after selecting a capacity station set of candidate pico stations, activates all pico stations in the capacity station set without checking whether the pico stations can absorb a load of the macro base station efficiently.

Further, in the whole process of implementing the solution, if a pico station sends only a pilot signal and a synchronization signal, the macro base station does not hand over a user who is in a linked state to the pico station.

A second embodiment of the present invention discloses a cell activation solution in which a macro base station is a UTRAN base station, and a pico station is an EUTRAN base station. The macro base station provides basic network coverage. The pico station is deployed in a pico station area in a coverage range of the macro base station to boost capacity and is completely covered by the macro base station. When a part or all of pico stations are in a dormant state and the macro base station is heavy-loaded, the pico stations may be activated by adopting the technical solution described in the present invention.

In this embodiment, the pico station uses two pilot transmit power levels in an activation decision process, which are $P_{low}$ and $P_{max}$ respectively, where $P_{low}$ is a certain preset power level that is lower than $P_{max}$, and $P_{max}$ may be maximum pilot transmit power of the pico station.

Main steps in the technical solution according to the second embodiment are as follows:

Step 1: When an OAM detects that the number of users who are in a linked state with the macro base station exceeds a preset threshold $C_{threshold}$, the OAM instructs a pico station in a capacity station set S to send a pilot signal and a synchronization signal at a pilot power level of $P_{low}$ in a time of T (the pico station stops sending after sending the signals in the time of T and returns to the dormant state), and instructs the macro base station; and the macro base station configures a user in a linked state to perform measurement and reporting on the pilot signal sent by the pico station in S. The procedure proceeds to step 2.

Step 2: The OAM performs the following operations according to a measurement result reported by the user of the macro base station: For each pico station Hi (i=1, 2, . . . , N), count the number of macro base station users that meet a handover condition and report a handover event when this pico station is used as a target base station, where the number of the macro base station users is marked as $C_{i,1}$; and sort pico stations in descending order of $C_{i,1}$. For sorted pico stations, if the first M (1≤M≤N) pico stations exist, which makes the total number of users who are in a current linked state with the macro base station minus a sum of $C_{i\_m,1}$ (m=1, 2, . . . , M) corresponding to the M pico stations be smaller than a preset threshold (a second threshold) $C_{threshold\_1}$ (namely, the total number of users who are in a current linked state with the macro base station minus a sum of $C_{i\_m,1}$ corresponding to the first M−1 pico stations is greater than the preset threshold $C_{threshold\_1}$), the M pico stations are used as candidate pico stations for activation, and are represented by a capacity station set $S_{wake\_up\_1}$ ($S_{wake\_up\_1}$ is a subset of the capacity station set S), and then the procedure proceeds to step 3; if M cannot be selected, namely, the total number of users who are in a current linked state with the macro base station minus a sum of $C_{i,1}$ corresponding to all pico stations in the capacity station set S is still greater than the preset threshold $C_{threshold\_1}$, the procedure proceeds to step 7.

Step 3: If $C_{i\_M,1}$ corresponding to an $M^{th}$ pico station in selected M pico stations is greater than a preset threshold (a third threshold) $C_{threshold\_2}$, the OAM activates a pico station in the capacity station set $S_{wake\_up\_1}$ and enables it to work at a pilot transmit power level of $P_{low}$, and instructs the macro base station about information of state transition and pilot power of the pico station, and other pico stations in the capacity station set S maintain a dormant state, and then the procedure proceeds to step 11; and if $C_{i\_M,1}$ corresponding to the $M^{th}$ pico station in the selected M pico stations is smaller than the preset threshold $C_{threshold\_2}$, the procedure proceeds to step 4.

Step 4: The OAM instructs the pico station in the capacity station set $S_{wake\_up\_1}$ to send a pilot signal and a synchronization signal at a pilot power level of $P_{max}$ in a time of T (the pico station stops sending after sending the signals in the time of T and returns to the dormant state), and instructs the macro base station; and the macro base station configures the user who is in a linked state to perform measurement and reporting on the pilot signal sent by the pico station in $S_{wake\_up\_1}$. The procedure proceeds to step 5.

Step 5: The OAM performs the following operations according to a measurement result reported by the user: For each pico station Hi (i=1, 2, ..., M), count the number of macro base station users that meet a handover condition and report a handover event when this pico station is used as a target base station, where the number of the macro base station users is marked as $C_{i,2}$; and sort pico stations in descending order of $C_{i,2}$. For sorted pico stations, if the first W (1≤W≤M) pico stations exist, which makes the total number of users who are in a current linked state with the macro base station minus a sum of $C_{i\_m',2}$ (m'=1, 2, ..., W) corresponding to the W pico stations be smaller than a preset threshold $C_{threshold\_1}$ (namely, the total number of users who are in a current linked state with the macro base station minus a sum of $C_{i\_m',2}$ corresponding to the first W−1 pico stations is greater than the preset threshold $C_{threshold\_1}$), the W pico stations are used as candidate pico stations for activation, and are represented by a capacity station set $S_{wake\_up\_2}$ ($S_{wake\_up\_2}$ is a subset of the capacity station set S), and then the procedure proceeds to step 6; and if W cannot be selected, namely, the total number of users who are in a current linked state with the macro base station minus a sum of $C_{i,2}$ corresponding to all pico stations in the capacity station set $S_{wake\_up\_1}$ is still greater than the preset threshold $C_{threshold\_1}$, the procedure proceeds to step 7.

Step 6: The OAM activates a pico station in the capacity station set $S_{wake\_up\_2}$ and enables it to work at a pilot transmit power level of $P_{max}$, and instructs the macro base station about information of state transition and pilot power of the pico station, and other pico stations in the capacity station set S maintain a dormant state, and then the procedure proceeds to step 11.

Step 7: The OAM instructs the pico station in the capacity station set S to send a pilot signal and a synchronization signal at a pilot power level of $P_{max}$ in a time of T (the pico station stops sending after sending the signals in the time of T and returns to the dormant state), and instructs the macro base station; and the macro base station configures the user who is in a linked state to perform measurement and reporting on the pilot signal sent by the pico station in S. The procedure proceeds to step 8.

Step 8: The OAM performs the following operations according to a measurement result reported by the user: For each pico station Hi (i=1, 2, ..., N), count the number of macro base station users that meet a handover condition and report a handover event when this pico station is used as a target base station, where the number of the macro base station users is marked as $C_{i,3}$; and sort pico stations in descending order of $C_{i,3}$. For sorted pico stations, if the first Q (1≤Q≤N) pico stations exist, which makes the total number of users who are in a current linked state with the macro base station minus a sum of $C_{i\_m'',3}$ (m''=1, 2, ..., Q) corresponding to the Q pico stations be smaller than a preset threshold $C_{threshold\_1}$ (namely, the total number of users who are in a current linked state with the macro base station minus a sum of $C_{i\_m'',3}$ corresponding to the first Q−1 pico stations is greater than the preset threshold $C_{threshold\_1}$), the Q pico stations are used as candidate pico stations for activation, and are represented by a capacity station set $S_{wake\_up\_3}$ ($S_{wake\_up\_3}$ is a subset of the capacity station set S), and then the procedure proceeds to step 9; and if Q cannot be selected, namely, the total number of users who are in a current linked state with the macro base station minus a sum of $C_{i,3}$ corresponding to all pico stations in the capacity station set S is still greater than the preset threshold $C_{threshold\_1}$, the procedure proceeds to step 10.

Step 9: The OAM activates a pico station in the capacity station set $S_{wake\_up\_3}$ and enables it to work at a pilot transmit power level of $P_{max}$, and instructs the macro base station about information of state transition and pilot power of the pico station, and other pico stations in the capacity station set S maintain a dormant state, and then the procedure proceeds to step 11.

Step 10: The OAM activates a pico station in the capacity station set S and enables it to work at a pilot transmit power level of $P_{max}$, and instructs the macro base station about information of state transition and pilot power of the pico station, and then the procedure proceeds to step 11.

Step 11: When the number of users who are in a linked state with the macro base station further rises and exceeds the preset threshold $C_{threshold}$, if pico stations activated but not working at full transmit power exist in a coverage range of the macro base station, the OAM instructs these pico stations activated but not working at full transmit power to increase pilot power to a maximum transmit power level, and instructs the macro base station about information of pilot power of the pico stations; and if the number of users who are in a linked state with the macro base station is still greater than $C_{threshold}$ after all activated pico stations in the coverage range of the macro base station work at the maximum pilot transmit power, the OAM and the macro base station repeat steps 1 to 10 to perform a pico station activation process until all pico stations in the coverage range of the macro base station are in a linked state and work at the maximum pilot transmit power.

It should be noted that if the pico stations use more than two pilot transmit power levels in an activation decision process, steps 1 to 6 are repeated.

It should further be noted that, if the preset threshold $C_{threshold\_2}$ is very small or even equal to 0, the OAM, after selecting a capacity station set of candidate pico stations, activates all pico stations in the capacity station set without checking whether the pico stations can absorb a load of the macro base station efficiently.

It should further be noted that, in the whole process of implementing the solution, if a pico station sends only a pilot signal and a synchronization signal, the macro base station does not hand over a user who is in a linked state to the pico station.

A network scenario of a third embodiment of the present invention is as follows: A base station A on a frequency f1 provides basic network coverage for a certain area, and a base station B/C/D on a frequency f2 overlaps with the base station A in coverage. The base station A and the base station B/C/D may be base stations of different standards, and may also be base stations of the same standard but different frequencies. A part or all of base stations B, C, and D are in a dormant state to save power. When the base station A is heavy-loaded, the technical solution disclosed in the present invention may be used to activate a part or all of base stations B, C, and D that are in a dormant state, enable them to work at proper pilot transmit power, and meanwhile, ensure that a load of the base station A is reduced to a proper level.

It is assumed that when the number of users who are in a linked state with the base station A on the frequency f1 exceeds a first threshold, a preset threshold $C_{threshold}$, a set of all capacity stations that are in a dormant state and overlap with the base station A in coverage on the frequency f2 is $S_{total}$, where N (N≥1) base stations in a dormant state participate in an activation decision, and are $H_1, H_2, \ldots, H_N$ respectively, and these base stations that participate in the activation decision and are on the frequency f2 are represented by a capacity station set S. It should be noted that S may be equal to $S_{total}$, and may also be a subset of $S_{total}$. That is, an OAM may enable all base stations that are in a dormant state and overlap with the base station A in coverage on the frequency f2 to participate in the activation decision, and may also select, according to some algorithms, only a part of the base stations that are in a dormant state and overlap with the base station A in coverage on the frequency f2 in advance for participating in the activation decision. For example, before executing an activation decision process of a base station, reference is made to a size and location of a coverage area of overlap between the base station A and each base station that is in a dormant state and overlaps with the base station A in coverage on the frequency f2; if an overlapping coverage area is very small and is located on the edge of the base station A, this base station is excluded from the capacity station set S. A base station that is in a dormant state and overlaps with the base station A in coverage on the frequency f2 but does not belong to the capacity station set S maintains the dormant state, and does not participate in the activation decision. A load herein includes at least the following factor: the number of users who are in a linked state.

Main steps in the third embodiment are as follows:

Step 1: When the OAM detects that the number of users who are in a linked state with the base station A exceeds a preset threshold $C_{threshold}$, the OAM instructs a base station in the capacity station set S to send a pilot signal and a synchronization signal at a pilot power level of $P_{low}$ in a time of T (the base station stops sending after sending the signals in the time of T and returns to a dormant state), and instructs the base station A; and the base station A configures a user in a linked state to perform measurement and reporting on the pilot signal sent by the base station in S. The procedure proceeds to step 2.

Step 2: The OAM performs the following operations according to a measurement result reported by a user of the base station A: For each base station $H_i$ (i=1, 2, ..., N) in the capacity station set S, count the number of users of the base station A that meet a handover condition and report a handover event when this base station is used as a target base station, where the number of the users is marked as $C_{i,1}$; and sort base stations in the capacity station set S in descending order of $C_{i,1}$. For sorted base stations, if the first M (1≤M≤N) base stations exist, which makes the total number of users who are in a current linked state with the base station A minus a sum of $C_{i\_m,1}$ (m=1, 2, ..., M) corresponding to the M base stations be smaller than a preset threshold $C_{threshold\_1}$ (namely, the total number of users who are in a current linked state with the base station A minus a sum of $C_{i\_m,1}$ corresponding to the first M−1 base stations is greater than the preset threshold $C_{threshold\_1}$), the M base stations are used as candidate base stations for activation, and are represented by a capacity station set $S_{wake\_up\_1}$ ($S_{wake\_up\_1}$ is a subset of the capacity station set S), and then the procedure proceeds to step 3; if M cannot be selected, namely, the total number of users who are in a current linked state with the base station A minus a sum of $C_{i,1}$ corresponding to all base stations in the capacity station set S is still greater than the preset threshold $C_{threshold\_1}$, the procedure proceeds to step 4.

Step 3: If $C_{i\_M,1}$ corresponding to an $M^{th}$ base station in selected M base stations is greater than a preset threshold $C_{threshold\_2}$, the OAM activates a base station in the capacity station set $S_{wake\_up\_1}$ and enables it to work at a pilot transmit power level of $P_{low}$, and instructs the base station A about information of state transition and pilot power of the base station, and other base stations in the capacity station set S maintain a dormant state, and then the procedure proceeds to step 8; and if $C_{i\_M,1}$ corresponding to the $M^{th}$ base station in the selected M base stations is smaller than the preset threshold $C_{threshold\_2}$, the procedure proceeds to step 4.

Step 4: The OAM instructs the base station in the capacity station set S to send a pilot signal and a synchronization signal at a pilot power level of $P_{max}$ in a time of T (the base station stops sending after sending the signals in the time of T and returns to the dormant state), and instructs the base station A; and the base station A configures the user who is in a linked state to perform measurement and reporting on the pilot signal sent by the base station in S. The procedure proceeds to step 5.

Step 5: The OAM performs the following operations according to a measurement result reported by the user: For each base station $H_i$ (i=1, 2, ..., N) in the capacity station set S, count the number of users of the base station A that meet a handover condition and report a handover event when this base station is used as a target base station, where the number of the users is marked as $C_{i,2}$; and sort base stations in the capacity station set S in descending order of $C_{i,2}$. For sorted base stations, if the first W (1≤W≤N) base stations exist, which makes the total number of users who are in a current linked state with the base station A minus a sum of $C_{1\_m',2}$ (m'=1, 2, ..., W) corresponding to the W base stations be smaller than a preset threshold $C_{threshold\_1}$ (namely, the total number of users who are in a current linked state with the base station A minus a sum of $C_{i\_m',2}$ corresponding to the first W−1 base stations is greater than the preset threshold $C_{threshold\_1}$), the W base stations are used as candidate base stations for activation, and are represented by a capacity station set $S_{wake\_up\_2}$ ($S_{wake\_up\_2}$ is a subset of the capacity station set S), and then the procedure proceeds to step 6; and if W cannot be selected, namely, the total number of users who are in a current linked state with the base station A minus a sum of $C_{i,2}$ corresponding to all base stations in the capacity station set S is still greater than the preset threshold $C_{threshold\_1}$, the procedure proceeds to step 7.

Step 6: The OAM activates a base station in the capacity station set $S_{wake\_up\_2}$ and enables it to work at a pilot transmit power level of $P_{max}$, and instructs the base station A about information of state transition and pilot power of the base station, and then the procedure proceeds to step 8.

Step 7: The OAM activates a base station in the capacity station set S and enables it to work at a pilot transmit power level of $P_{max}$, and instructs the base station A about information of state transition and pilot power of the base station, and then the procedure proceeds to step 8.

Step 8: When the number of users who are in a linked state with the base station A further rises and exceeds the preset threshold $C_{threshold}$, if base stations activated but not working at full transmit power exist among base stations that overlap with the base station A in coverage on the frequency f2, the OAM instructs these base stations activated but not working at full transmit power to increase pilot power to a maximum transmit power level, and instructs the base station A about information of pilot power of the base stations; if the number of users who are in a linked state with the base station A is still higher than $C_{threshold}$ when all activated base stations that overlap with the base station A in coverage on the frequency f2 work at the maximum pilot transmit power, the OAM repeats steps 1 to 7 to perform a base station activation process until all base stations that overlap with the base station A in coverage on the frequency f2 are in a linked state and work at the maximum pilot transmit power.

It should be noted that if the base stations use more than two pilot transmit power levels in an activation decision process, steps 1 to 3 are repeated.

It should further be noted that, if the preset threshold $C_{threshold\_2}$ is very small or even equal to 0, the OAM, after selecting a capacity station set of candidate base stations, activates all base stations in the capacity station set without checking whether the base stations can absorb a load of the base station A efficiently.

It should further be noted that, in the whole process of implementing the solution, if a base station on the frequency f2 sends only a pilot signal and a synchronization signal, the base station A does not hand over a user who is in a linked state to the base station.

The technical solution described in the present invention is applicable to a network scenario: A base station A on a frequency f1 provides basic network coverage for a certain area, and a base station B on a frequency f2 is co-sited with the base station A and overlaps with the base station A in coverage. The base station A and the base station B may be base stations of different standards, and may also be base stations of the same standard but different frequencies. The base station B is in a dormant state to save power. When the base station A is heavy-loaded, the technical solution provided in the present invention may be used to activate the base station B, enable the base station B to work at proper pilot transmit power, and meanwhile, ensure that a load of the base station A is reduced to a proper level.

Main steps of the technical solution in the present invention are as follows:

Step 1: When an OAM detects that a load of the base station A exceeds a preset threshold $C_{threshold}$, the OAM activates the base station B and enables it to work at a pilot transmit power level of $P_{low}$, and instructs the base station A about information of state transition and pilot power of the base station B, and the procedure proceeds to step 2.

Step 2: The base station A transfers a part of the load to the base station B, so that the load of the base station A is lower than the preset threshold $C_{threshold}$ and a load of the base station B is lower than a preset threshold $C_{threshold\_1}$. The procedure proceeds to step 3.

Step 3: If the load of the base station A further rises and exceeds the preset threshold $C_{threshold}$, and the load of the base station B exceeds the preset threshold $C_{threshold\_1}$, the OAM instructs the base station B to increase pilot transmit power to a $P_{max}$ level, and instructs the base station A about information of pilot power of the base station B.

It should be noted that if the base station B uses more than two pilot transmit power levels in an activation process, steps 1 to 3 are repeated.

In a network scenario in a fifth embodiment, a macro base station provides basic network coverage, and is a coverage station; and a pico station is deployed in a pico station area in a coverage range of the macro base station to boost capacity, and is a capacity station and is completely covered by the macro base station. When a part or all of pico stations are in a dormant state and the macro base station is heavy-loaded, the pico stations may be activated by adopting the technical solution described in the present invention. The macro base station and the pico station herein may be based on the same standard, and may also be based on different standards.

In this embodiment, the pico station uses N (N>1) pilot transmit power levels in an activation decision process (which is described as N pilot transmit power levels, where one transmit power value is one pilot transmit power level): $0<P_1<P_2<\ldots<P_N=P_{max}$, where $P_{max}$ is a maximum pilot transmit power of the pico station.

Main steps in the technical solution described in the present invention are as follows:

Step 1: The macro base station or an OAM determines capacity stations that participate in an activation decision, which are represented by a capacity station set $S_0$ (S may be a set of all capacity stations in a dormant state in the coverage range of the macro base station, and may also be a subset of the foregoing capacity station set). n is initialized to 1, and the procedure proceeds to step 2.

Step 1 is optional. For example, it is regarded by default that all capacity stations in a dormant state are capacity stations that need to participate in an activation decision, and it may also be that, before the macro base station or the OAM performs a process of a capacity station activation decision, reference is made to long-term load statistics information of each capacity station in a dormant state. If the long-term load statistics information shows that in a subsequent time period, a certain capacity station maintains a quite low load level for a long time after being activated, or can maintain a medium or high load level only for a quite short time, the macro base station excludes this capacity station from the capacity station set S. In the coverage range of the macro base station, a capacity station that is in a dormant state but does not belong to the capacity station set S maintains the dormant state, and does not participate in the activation decision.

Step 2: If n<N, m is initialized to 1, the macro base station or the OAM instructs a capacity station in the capacity station set $S_0$ to send a pilot signal and a synchronization signal at a pilot power level of $P_n$, and configures a user of the macro base station to measure the pilot signal sent by the capacity station in $S_0$ and report a measurement result, and then the procedure proceeds to step 3. If n=N, the procedure proceeds to step 7.

Step 3: The macro base station or the OAM receives a measurement result sent by each user, and selects a candidate capacity station set $S_m$ ($S_m$ is a subset of $S_{m-1}$) according to the measurement result reported by the user of the macro base station and a preset algorithm. If the candidate capacity station set $S_m$ cannot be selected according to the preset algorithm, n=n+1, and the procedure returns to step 2; if the capacity station set $S_m$ exists and m<N, the procedure proceeds to step 4; and if the capacity station set $S_m$ exists and m=N, the procedure proceeds to step 5.

Step 4: If each capacity station in the capacity station set $S_m$ works at a pilot power level of $P_{m+n-1}$ and can bear a load of the macro base station efficiently, namely, meets a system optimization requirement and absorbs the load of the macro base station properly, the macro base station or the OAM activates all capacity stations in the capacity station set $S_m$, and enables them to work at the pilot transmit power level of $P_{m+n-1}$, and the procedure proceeds to step 8; otherwise, m=m+1, and the procedure proceeds to step 6.

Step 5: The macro base station or the OAM activates all capacity stations in the capacity station set $S_m$ and enables them to work at the pilot transmit power level of $P_{m+n-1}$, and the procedure proceeds to step 8.

Step 6: The macro base station or the OAM instructs a capacity station in the capacity station set $S_{m-1}$ to send a pilot signal and a synchronization signal at a pilot power level of $P_{m+n-1}$, and configures the user of the macro base station to perform measurement and reporting on the pilot signal sent by the capacity station in $S_{m-1}$, and the procedure returns to step 3.

Step 7: The macro base station or the OAM instructs the capacity station in the capacity station set $S_0$ to send a pilot signal and a synchronization signal at a pilot power level of $P_N$, and configures the user of the macro base station to perform measurement and reporting on the pilot signal sent by the capacity station in $S_0$. The macro base station or the OAM selects a candidate capacity station set $S_1$ ($S_1$ is a subset of $S_0$) according to a measurement result reported by the user of the macro base station and the preset algorithm. If the capacity station set $S_1$ exists, the macro base station or the OAM activates all capacity stations in $S_1$ and enables them to work at the pilot transmit power level of $P_N$, and the procedure proceeds to step 8; otherwise, the macro base station or the OAM activates all capacity stations in $S_0$ and enables them to work at the pilot transmit power level of $P_N$, and the procedure proceeds to step 8.

Step 8: When the load of the macro base station further rises and exceeds a preset threshold, if capacity stations activated but not working at full transmit power exist in a coverage range of the macro base station, the macro base station or the OAM instructs these capacity stations activated but not working at full transmit power to increase pilot power to a maximum transmit power level; and if the load of the macro base station is still higher than the preset threshold after all activated capacity stations in a coverage range of the macro base station work at the maximum pilot transmit power, the macro base station or the OAM repeats steps 1 to 7 to perform a capacity station activation process until all capacity stations in the coverage range of the macro base station are in a linked state and work at the maximum pilot transmit power.

It should be noted that in the foregoing process, after selecting the candidate capacity station set $S_1$ ($S_1$ is a subset of $S_0$) according to the measurement result reported by the user of the macro base station and the preset algorithm, the macro base station or the OAM may also activate all capacity stations in the capacity station set $S_1$ directly and enables them to work at a current pilot transmit power level without checking load-bearing efficiency of the capacity stations in the capacity station set $S_1$. That is, step 4 and step 6 are omissible in the foregoing steps, and main steps of the technical solution are simplified as follows:

Step 1: The macro base station or an OAM selects capacity stations that participate in an activation decision, which are represented by a capacity station set $S_0$ ($S_0$ may be a set of all capacity stations in a dormant state in the coverage range of the macro base station, and may also be a subset of the foregoing capacity station set). n is initialized to 1, and the procedure proceeds to step 2. In specific implementation, step 1 is optional. For example, it is regarded by default that all capacity stations are capacity stations that need to participate in a decision, and therefore, it is regarded by default that all capacity stations make up a first capacity station set $S_0$.

Step 2: If n<N, the macro base station or the OAM instructs a capacity station in the capacity station set $S_0$ to send a pilot signal and a synchronization signal at a pilot power level of $P_n$, and configures a user of the macro base station to perform measurement and reporting on the pilot signal sent by the capacity station in $S_0$, and then the procedure proceeds to step 3. If n=N, the procedure proceeds to step 5.

Step 3: The macro base station or the OAM selects a candidate capacity station set $S_1$ ($S_1$ is a subset of $S_0$) according to a measurement result reported by the user of the macro base station and a preset algorithm. If the candidate capacity station set $S_1$ cannot be selected according to the preset algorithm, n=n+1, and the procedure returns to step 2; if the candidate capacity station set $S_1$ that meets a system requirement is selected according to the preset algorithm, the procedure proceeds to step 4.

Step 4: The macro base station or the OAM activates all capacity stations in the capacity station set $S_1$ and enables them to work at a pilot transmit power level of $P_n$, and the procedure proceeds to step 6.

Step 5: The macro base station or the OAM instructs a capacity station in the capacity station set $S_0$ to send a pilot signal and a synchronization signal at a pilot power level of $P_N$, and configures the user of the macro base station to perform measurement and reporting on the pilot signal sent by the capacity station in $S_0$. The macro base station or the OAM selects a candidate capacity station set $S_1$ ($S_1$ is a subset of $S_0$) according to a measurement result reported by the user of the macro base station and the preset algorithm. If the capacity station set $S_1$ exists, the macro base station or the OAM activates all capacity stations in $S_1$ and enables them to work at the pilot transmit power level of $P_N$, and the procedure proceeds to step 6; otherwise, the macro base station or the OAM activates all capacity stations in $S_0$ and enables them to work at the pilot transmit power level of $P_N$, and the procedure proceeds to step 6.

Step 6: When the load of the macro base station further rises and exceeds a preset threshold, if capacity stations activated but not working at full transmit power exist in a coverage range of the macro base station, the macro base station or the OAM instructs these capacity stations activated but not working at full transmit power to increase pilot power to a maximum transmit power level; and if the load of the macro base station is still higher than the preset threshold after all activated capacity stations in a coverage range of the macro base station work at the maximum pilot transmit power, the macro base station or the OAM repeats steps 1 to 7 to perform a capacity station activation process until all capacity stations in the coverage range of the macro base station are in a linked state and work at the maximum pilot transmit power.

In the foregoing two complete steps, the macro base station or the OAM selects a candidate capacity station set according to the measurement result reported by the user of the macro base station and the preset algorithm. Herein, the preset algorithm includes:

The macro base station or the OAM makes statistics of a situation that a load of the macro base station can be absorbed by each capacity station when each capacity station sends a pilot signal at current power, sorts capacity stations in descending order of an absorbable load, and selects the first several or multiple capacity stations to make up a candidate capacity station set, so that the load of the macro base station is reduced to a proper level after all capacity stations in the capacity station set bear the load.

Alternatively, the macro base station or the OAM selects a candidate capacity station set with reference to a load that can be absorbed by each capacity station when this capacity station sends a pilot signal at current power, a load that can be absorbed when each capacity station sends a pilot signal at a previous power level, and a difference between the two. For example, a part of capacity stations are selected as a roughly selected capacity station set according to whether the load that can be absorbed by each capacity station when this capacity station sends a pilot signal at current power exceeds a certain preset threshold, and then a candidate capacity station set is finely selected out of the roughly selected capacity station set according to a difference between the load that can be absorbed by each capacity station when each capacity station sends a pilot signal at current power and the load that can be absorbed by each capacity station when each capacity station sends a pilot signal at a previous power level, so that the load of the macro base station is reduced to a proper level after all capacity stations in the candidate capacity station set bear the load.

It should be noted that in the whole process of implementing the solution, if a capacity station sends only a pilot signal and a synchronization signal, the macro base station does not hand over a user who is in a linked state to the capacity station.

In each foregoing embodiment, a capacity station sends a pilot signal in a power increasing manner according to an instruction of a coverage station or an OAM, and the coverage station configures a user to perform measurement and reporting on the pilot signal sent by the capacity station at different power levels, and analyzes and processes each measurement result reported by the user. Therefore, in one aspect, a load that is of the coverage station and can be absorbed by each capacity station after this capacity station is activated may be determined. In another aspect, a situation of possible user distribution after capacity stations are activated may be obtained. With reference to the two aspects of information, the coverage station or the OAM may greatly improve accuracy of deciding activation of the capacity stations, activates a proper capacity station, and meanwhile, avoids that an improper capacity station is activated. Therefore, power and resource waste caused by improper activation of a capacity station is avoided, unnecessary user mobility between the capacity station and the coverage station is avoided, and an energy-saving effect of a network is improved on the whole.

Meanwhile, an embodiment of the present invention further provides an apparatus and a system for implementing the foregoing method. In the embodiment of the apparatus and the system, the method that can be implemented by the apparatus and the system is as described in the foregoing.

Figure 2:
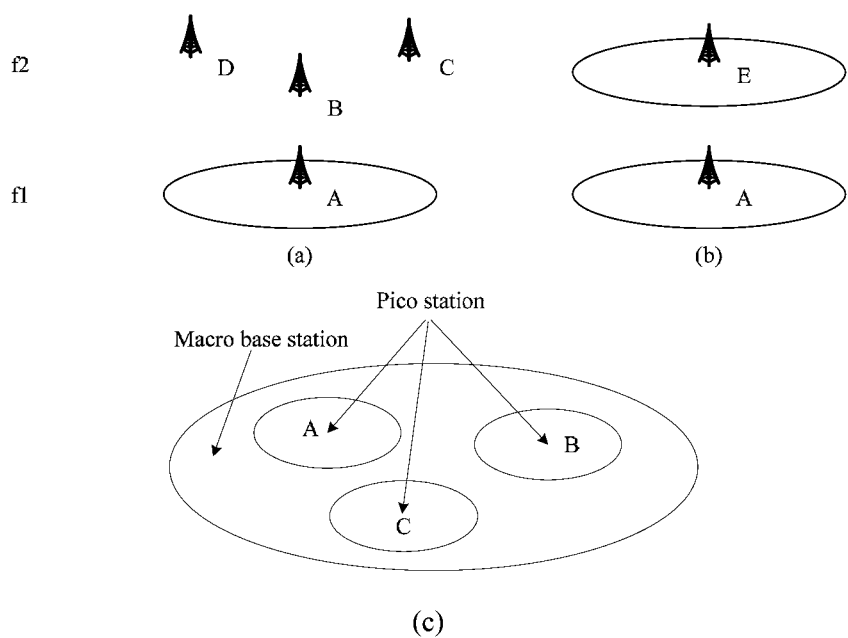
FIG. 2 is a schematic diagram of a radio communication system according to an embodiment of the present invention.

FIG. 2 is a schematic diagram of a radio communication system, where the radio communication system includes a capacity station and a coverage station, where the capacity station belongs to the coverage station, and the coverage station includes at least two transmit power levels. In (a) of FIG. 2, coverage of a base station A overlaps with coverage of a base station B/C/D that is based on a different standard, or based on the same standard but a different frequency; and in (b) of FIG. 2, a base station A is co-sited with a base station E that is based on a different standard, or based on the same standard but a different frequency, the base station A on a frequency f1 provides basic network coverage for a certain area and is a coverage station, and the base station E on a frequency f2 is a capacity station. In (a) and (b) of FIG. 2, A is a coverage station, and B, C, D, and E are capacity stations respectively. In (c), a macro base station provides basic network coverage and is a coverage station, and a pico station upgrades a service or boosts capacity and overlaps with the coverage station in coverage, and is a capacity station.

The coverage station is configured to: send multiple pieces of activation control information to the capacity station, where the multiple pieces of activation control information enables the capacity station to send a pilot signal to a user in a power increasing manner; receive a measurement result of measuring the pilot signal by the user; determine, according to the measurement result, a capacity station that needs to be activated to meet a system requirement; and send activation information to a determined capacity station that needs to be activated.

The capacity station is configured to: receive the activation control information from the coverage station; send the pilot signal to the user in a power increasing manner until the coverage station determines a capacity station that needs to be activated to meet a system requirement; and is further configured to, in a dormant state, receive the activation information sent by the coverage station, change to a working state, and work at power of sending the pilot signal by the capacity station when the coverage station sends the activation information to a determined capacity station that needs to be activated.

Figure 3:
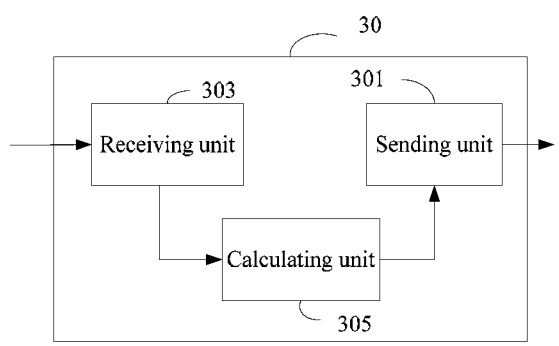
FIG. 3 is a schematic structural diagram of a base station according to an embodiment of the present invention.

Further, an embodiment of the present invention provides a base station. The base station serves as a coverage station and can implement processing of the coverage station described in the foregoing method embodiment. For a detailed processing procedure, reference is made to the description in the foregoing method embodiment. FIG. 3 is a schematic structural diagram of a base station 30 according to an embodiment of the present invention. The base station includes:

a sending unit 301, configured to send multiple pieces of activation control information to a capacity station that belongs to the base station, where the multiple pieces of activation control information are used to enable the capacity station to send a pilot signal to a user in a power increasing manner;

a receiving unit 303, configured to receive a measurement result of measuring the pilot signal by the user; and a calculating unit 305, configured to: determine, according to the measurement result of measuring the pilot signal by the user, a capacity station that needs to be activated to meet a system requirement, where the sending unit 301 sends activation information to the capacity station that needs to be activated, so that the capacity station that needs to be activated and is in a dormant state changes to a working state and works at power of sending the pilot signal by the capacity station when the coverage station sends the activation information to a determined capacity station that needs to be activated.

Further, the sending unit 301 is configured to send first activation control information to the capacity station, where the first activation control information is used to enable the capacity station to send a pilot signal to the user at first transmit power; and therefore, the receiving unit 303 is further configured to receive a first measurement result of measuring the pilot signal by the user, the calculating unit 305 is configured to determine, according to the first measurement result, a capacity station that needs to be activated to meet a system requirement, and the sending unit 301 is configured to send activation information to the capacity station that needs to be activated, so that the capacity station that needs to be activated works at the first transmit power after being activated.

If a capacity station that needs to be activated to meet a system requirement cannot be selected according to the first measurement result, the sending unit 301 is further configured to send second activation control information to the capacity station, where the second control information is used to enable the capacity station to send a pilot signal at second transmit power to a user who is in a linked state with the coverage station; the receiving unit 303 is further configured to receive a second measurement result of measuring the pilot signal by the user; the calculating unit 305 is further configured to determine, according to the second measurement result, a capacity station that needs to be activated; and the sending unit 301 is configured to send activation information to the capacity station that needs to be activated, so that the capacity station that needs to be activated works at the second transmit power after being activated.

Further, the sending unit 301 is configured to send configuration information to a user to which the base station provides a service, where the configuration information is used to enable the user to measure a received pilot signal and return a measurement result.

The calculating unit 305 determines, according to the first measurement result, the capacity station that needs to be activated to meet a system requirement, which may include:

determining, according to the first measurement result sent by a user that is covered by each capacity station, a load borne by each capacity station, where if M capacity stations exist, which makes a current load of the coverage station all loads of the M capacity stations be smaller than or equal to a second threshold, the M capacity stations are capacity stations that need to be activated;

otherwise, a capacity station that needs to be activated to meet a system requirement cannot be selected.

Further, the calculating unit 305 determines, according to the first measurement result, the capacity station that needs to be activated to meet a system requirement, which further includes:

if M capacity stations exist, which makes a current load of the coverage station minus loads of M−1 of the capacity stations be greater than or equal to the second threshold, and makes a current load of the coverage station all loads of the M capacity stations be smaller than or equal to the second threshold, the M capacity stations are capacity stations that need to be activated.

The calculating unit 305 determines, according to the second measurement result, the capacity station that needs to be activated, which includes: determining, according to the second measurement result sent by the user that is covered by each capacity station, a load borne by each capacity station, where, if Q capacity stations exist, which makes a current load of the coverage station minus loads of Q−1 of the capacity stations be greater than or equal to the second threshold, or makes a current load of the coverage station all loads of the Q capacity stations be smaller than or equal to the second threshold, the Q capacity stations are capacity stations that need to be activated; otherwise, a capacity station that needs to be activated to meet a system requirement cannot be selected.

In the foregoing embodiment, in the radio communication system, a capacity station sends a pilot signal in a power increasing manner according to an instruction of a coverage station, and the coverage station configures a user to perform measurement and reporting on the pilot signal sent by the capacity station at different power levels, and analyzes and processes each measurement result reported by the user. Therefore, in one aspect, a load that is of the coverage station and can be absorbed by each capacity station after this capacity station is activated may be determined. In another aspect, a situation of possible user distribution after capacity stations are activated may be obtained. With reference to the two aspects of information, the coverage station may greatly improve accuracy of deciding activation of the capacity stations, activates a proper capacity station, and meanwhile, avoids that an improper capacity station is activated. Therefore, power and resource waste caused by improper activation of a capacity station is avoided, unnecessary user mobility between the capacity station and the coverage station is avoided, and an energy-saving effect of a network is improved on the whole.

Persons of ordinary skill in the art may understand that all or a part of the steps of the foregoing method embodiments may be implemented by a program instructing relevant hardware. The program may be stored in a computer readable storage medium. When the program runs, the steps of the foregoing method embodiments are executed. The storage medium may be any medium capable of storing program codes, such as a ROM, RAM, magnetic disk, or optical disk.

What is claimed is:

1. A capacity station activation method, comprising:
   sending first activation control information to a capacity station, wherein the first activation control information is used to enable the capacity station to send a pilot signal at first transmit power to a user who is in a linked state with a coverage station, and the capacity station belongs to the coverage station;
   receiving a first measurement result of measuring the pilot signal by the user, and determining, according to the first measurement result, a capacity station that needs to be activated to meet a system requirement;
   sending activation information to the capacity station that needs to be activated, so that the capacity station that needs to be activated works at the first transmit power after being activated; and
   if a capacity station that needs to be activated to meet a system requirement cannot be selected according to the first measurement result, sending second activation control information to the capacity station, wherein the second control information is used to enable the capacity station to send a pilot signal at second transmit power to the user who is in a linked state with the coverage station; receiving a second measurement result of measuring the pilot signal by the user, and determining, according to second measurement result, a capacity station that needs to be activated; and sending activation information to the capacity station that needs to be activated, so that the capacity station that needs to be activated works at the second transmit power after being activated;
   wherein, the first transmit power is smaller than the second transmit power.

2. The method according to claim 1, further comprising:
   determining a load of the coverage station, and sending the first activation control information to the capacity station when the load of the coverage station is greater than a threshold, wherein the capacity station belongs to the coverage station and is in a dormant state.

3. The method according to claim 2, wherein:
   the receiving the first measurement result of measuring the pilot signal by the user, and determining, according to the first measurement result, the capacity station that needs to be activated to meet a system requirement comprise:
   receiving a first measurement result sent by a user that is covered by each capacity station, and determining a load borne by each capacity station; wherein
   if M capacity stations exist, which makes a current load of the coverage station minus all loads of the M capacity stations be smaller than or equal to a second threshold, the M capacity stations are capacity stations that need to be activated;
   otherwise, a capacity station that needs to be activated to meet a system requirement cannot be selected.

4. The method according to claim 3, further comprising:
   if M capacity stations exist, which makes the current load of the coverage station minus loads of M−1 of the capacity stations be greater than or equal to the second threshold, and makes the current load of the coverage station minus all loads of the M capacity stations be smaller than or equal to the second threshold, the M capacity stations are capacity stations that need to be activated.

5. The method according to claim 3, further comprising:
   if a load of a lightest-loaded capacity station among the M capacity stations is smaller than a third threshold, sending the second activation control information to the capacity station that needs to be activated, wherein the second activation control information is used to enable the capacity station that needs to be activated to send a pilot signal at the second transmit power to the user who is in a linked state with the coverage station; and receiving a second measurement result of measuring the pilot signal by the user, wherein: if W of the M capacity stations that need to be activated exist, which makes the current load of the coverage station minus loads of W−1 of the M capacity stations be greater than or equal to the second threshold, the W capacity stations are final capacity stations that need to be activated, wherein $1 \leq W \leq M$.

6. The method according to claim 1, wherein:
the sending first activation control information to a capacity station further comprises:
according to history load information, selecting a candidate capacity station for participating in an activation decision among capacity stations that belong to the coverage station; wherein
the capacity station to which the first activation control information is sent is the candidate capacity station for participating in the activation decision.

7. The method according to claim 1, wherein:
if a capacity station that needs to be activated to meet a system requirement cannot be selected according to the second measurement result, activation information is sent to the capacity station that belongs to the coverage station, and an activated capacity station is enabled to work at a maximum transmit power.

8. The method according to claim 1, wherein:
configuration information is sent to a user that belongs to the coverage station or to a user that belongs to the coverage station through the capacity station, wherein the configuration information is used to enable the user to measure a received pilot signal and send a measurement result to the coverage station.

9. The method according to claim 1, wherein:
the second transmit power is a maximum transmit power of the capacity station.

10. The method according to claim 1, wherein:
the receiving the second measurement result of measuring the pilot signal by the user, and determining, according to the second measurement result, the capacity station that needs to be activated comprise:
receiving the second measurement result sent by a user that is covered by each capacity station, and determining a load borne by each capacity station; wherein
if Q capacity stations exist, which makes a current load of the coverage station minus all loads of the Q capacity stations be smaller than or equal to the second threshold, the Q capacity stations are capacity stations that need to be activated;
otherwise, a capacity station that needs to be activated to meet a system requirement cannot be selected.

11. A radio communication system, comprising a capacity station and a coverage station, wherein the capacity station belongs to the coverage station, and the coverage station comprises at least two transmit power levels;
the coverage station is configured to: send multiple pieces of activation control information to the capacity station, wherein the multiple pieces of activation control information enables the capacity station to send a pilot signal to a user in a power increasing manner; receive a measurement result of measuring the pilot signal by the user; determine, according to the measurement result, a capacity station that needs to be activated to meet a system requirement; and send activation information to a determined capacity station that needs to be activated; and
the capacity station is configured to: receive the activation control information from the coverage station; send the pilot signal to the user in a power increasing manner until the coverage station determines a capacity station that needs to be activated to meet a system requirement; and is further configured to, in a dormant state, receive the activation information sent by the coverage station, change to a working state, and work at power of sending the pilot signal by the capacity station when the coverage station sends the activation information to a determined capacity station that needs to be activated.

12. The system according to claim 11, wherein:
when the coverage station is configured to send activation control information to the capacity station, receive a measurement result of measuring the pilot signal by the user, and determine, according to the measurement result, a capacity station that needs to be activated to meet a system requirement,
the coverage station sends first activation control information to the capacity station, wherein the first activation control information is used to enable the capacity station to send a pilot signal at first transmit power to a user who is in a linked state with the coverage station, and the capacity station belongs to the coverage station;
the coverage station receives a first measurement result of measuring the pilot signal by the users, and determines, according to the first measurement result, a capacity station that needs to be activated to meet a system requirement;
the coverage station sends activation information to the capacity station that needs to be activated, so that the capacity station that needs to be activated works at the first transmit power after being activated; and
if a capacity station that needs to be activated to meet a system requirement cannot be selected according to the first measurement result, the coverage station sends second activation control information to the capacity station, wherein the second control information is used to enable the capacity station to send a pilot signal at second transmit power to the user who is in a linked state with the coverage station; the coverage station receives a second measurement result of measuring the pilot signal by the user, and the coverage station determines, according to the second measurement result, a capacity station that needs to be activated; the coverage station sends activation information to the capacity station that needs to be activated, so that the capacity station that needs to be activated works at the second transmit power after being activated;
wherein, the first transmit power is smaller than the second transmit power.

13. A radio communication base station, comprising:
a sending unit, configured to send multiple pieces of activation control information to a capacity station that belongs to the base station, wherein the multiple pieces of activation control information are used to enable the capacity station to send a pilot signal to a user in a power increasing manner;
a receiving unit, configured to receive a measurement result of measuring the pilot signal by the user; and a calculating unit, configured to: determine, according to the measurement result of measuring the pilot signal by the user, a capacity station that needs to be activated to meet a system requirement, wherein the sending unit sends activation information to the capacity station that needs to be activated, so that the capacity station that needs to be activated and is in a dormant state changes to a working state and works at power of sending the pilot signal by the capacity station when the coverage station sends the activation information to a determined capacity station that needs to be activated.

14. The base station according to claim 13, wherein:
the sending unit is specifically configured to send first activation control information to the capacity station, wherein the first activation control information is used to enable the capacity station to send a pilot signal to the user at first transmit power; and
therefore, the receiving unit is further configured to receive a first measurement result of measuring the pilot signal by the user; the calculating unit determines, according to the first measurement result, a capacity station that needs to be activated to meet a system requirement; and the sending unit sends activation information to the capacity station that needs to be activated, so that the capacity station that needs to be activated works at the first transmit power after being activated.

15. The base station according to claim 14, wherein:
if a capacity station that needs to be activated to meet a system requirement cannot be selected according to the first measurement result,
the sending unit is further configured to send second activation control information to the capacity stations, wherein the second activation control information is used to enable the capacity station to send a pilot signal at second transmit power to a user who is in a linked state with the coverage station;
the receiving unit is further configured to receive a second measurement result of measuring the pilot signal by the user; the calculating unit determines, according to the second measurement result, a capacity station that needs to be activated; and the sending unit sends activation information to the capacity station that needs to be activated, so that the capacity station that needs to be activated works at the second transmit power after being activated.

16. The base station according to claim 15, wherein:
the sending unit is further configured to send configuration information to a user to which the base station provides a service, wherein the configuration information is used to enable the user to measure a received pilot signal and return a measurement result.

17. The base station according to claim 15, wherein:
the calculating unit determines, according to the second measurement result, a capacity station that needs to be activated, which comprises:
determining, according to the second measurement result sent by a user that is covered by each capacity station, a load borne by each capacity station; wherein
if Q capacity stations exist, which makes a current load of the coverage station minus loads of Q−1 of the capacity stations be greater than or equal to a second threshold, or makes a current load of the coverage station minus all loads of the Q capacity stations be smaller than or equal to the second threshold, the Q capacity stations are capacity stations that need to be activated;
otherwise, a capacity station that needs to be activated to meet a system requirement cannot be selected.

18. The base station according to claim 14, wherein:
the calculating unit determines, according to the first measurement result, a capacity station that needs to be activated to meet a system requirement, which comprises:
determining, according to the first measurement result sent by a user that is covered by each capacity station, a load borne by each capacity station; wherein
if M capacity stations exist, which makes a current load of the coverage station minus all loads of the M capacity stations be smaller than or equal to a second threshold, the M capacity stations are capacity stations that need to be activated;
otherwise, a capacity station that needs to be activated to meet a system requirement cannot be selected.

19. The base station according to claim 18, wherein:
the calculating unit determines, according to the first measurement result, a capacity station that needs to be activated to meet a system requirement, which further comprises:
if M capacity stations exist, which makes a current load of the coverage station minus loads of M−1 of the capacity stations be greater than or equal to the second threshold, and makes the current load of the coverage station minus all loads of the M capacity stations be smaller than or equal to the second threshold, the M capacity stations are capacity stations that need to be activated.

* * * * *